UNITED STATES PATENT OFFICE.

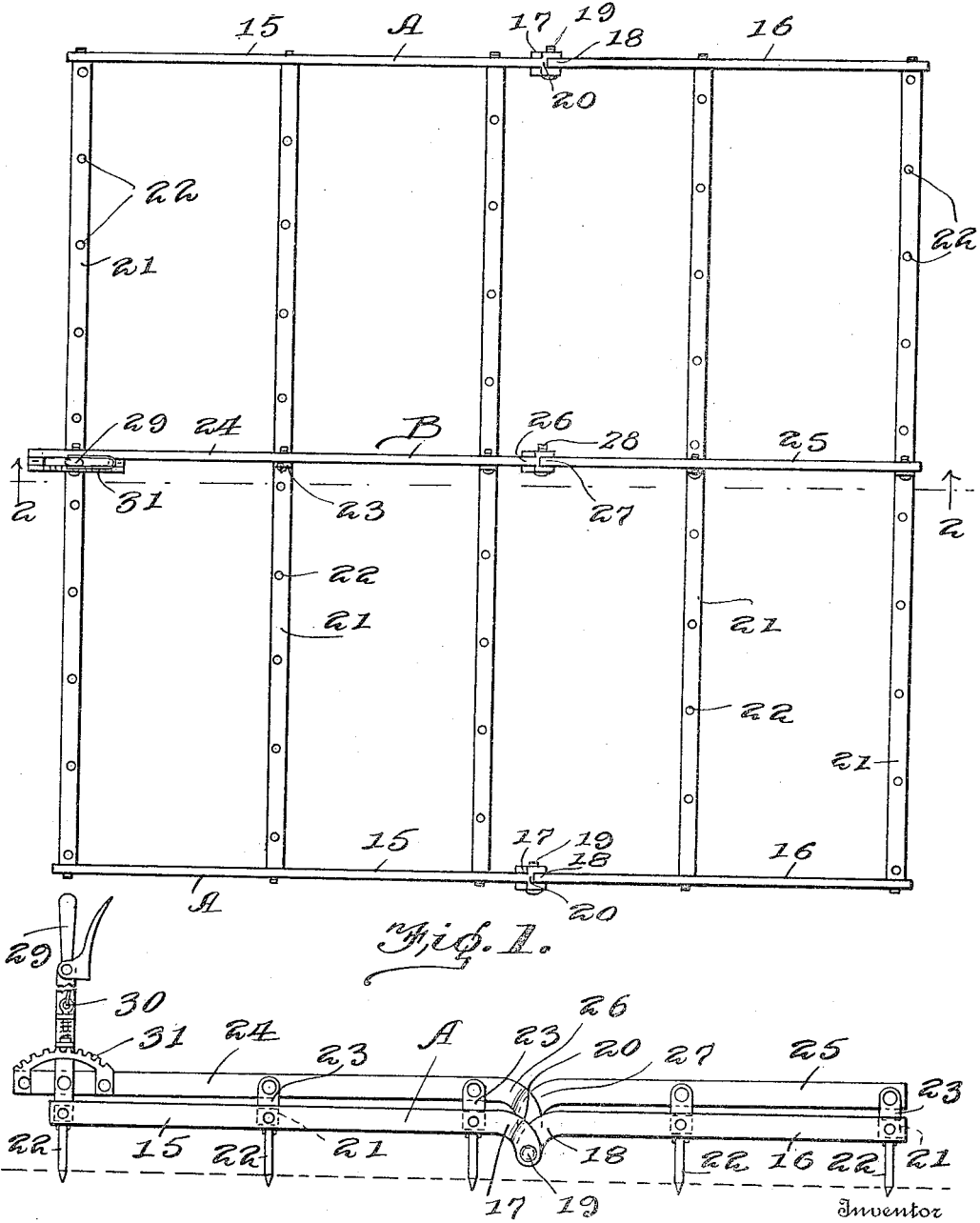

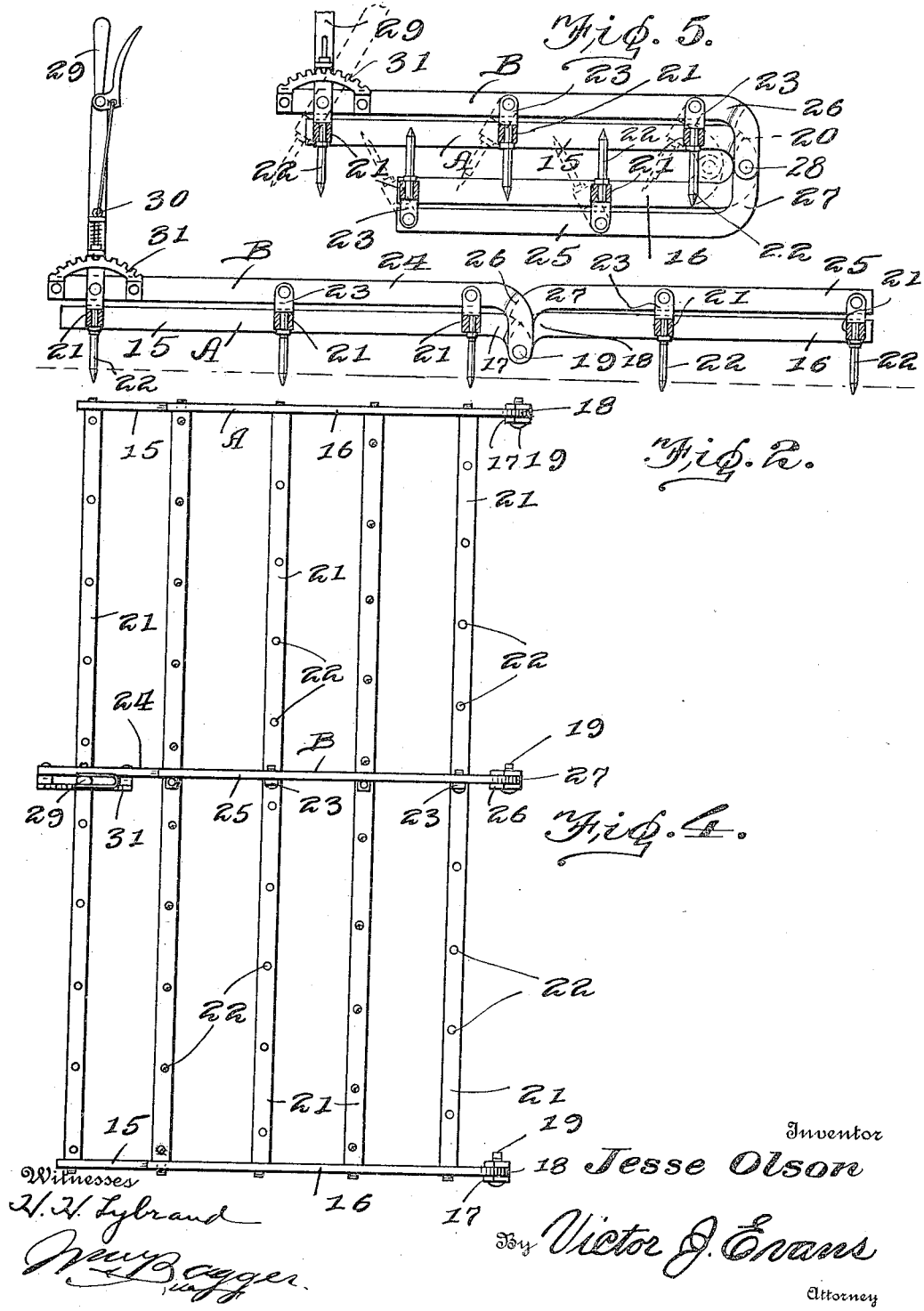

JESSE OLSON, OF WILD ROSE, WISCONSIN.

HARROW.

1,232,380.

Specification of Letters Patent.

Patented July 3, 1917.

Application filed November 21, 1916. Serial No. 132,631.

*To all whom it may concern:*

Be it known that I, JESSE OLSON, a citizen of the United States, residing at Wild Rose, in the county of Waushara and State of Wisconsin, have invented new and useful Improvements in Harrows, of which the following is a specification.

This invention relates to harrows and particularly to that type of harrow in which the harrow teeth are fixed in bars that are supported for rocking movement in the harrow frame, the object being to enable the harrow teeth to be positioned at various angles with respect to the surface of the ground by means of an adjusting lever with which the several rocking bars are connected.

The present invention has for its object to so construct the harrow frame as to enable it to be folded in small compass for convenience in handling, in loading on a wagon or unloading the same.

A further object of the invention is to so construct and improve the folding harrow frame that the pointed ends of the teeth will be accommodated between the folded parts of the frame without being obstructed or interfered with.

Further objects of the invention are to simplify and improve the construction and operation of the detailed parts of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a harrow constructed in accordance with the invention.

Fig. 2 is a longitudinal sectional view taken on the line 2—2 in Fig. 1.

Fig. 3 is a side elevation.

Fig. 4 is a plan view showing the harrow folded.

Fig. 5 is a transverse sectional view of the same.

Corresponding parts in the several figures are denoted by like characters of reference.

The frame of the improved harrow is composed mainly of side members A, A, each of said side members including a front member 15 and a rear member 16. The front and rear members 15, 16 are provided at their meeting ends with downturned arcuate brackets 17, 18, the brackets 17 being bifurcated for the reception of the terminals of the brackets 18, said brackets being pivotally connected together by pivot members 19. The bifurcated ends of the bracket members 17 present bridge portions 20 whereby swinging movement in an upward direction of the respective members 15 and 16 will be limited. The pivot members 19 constitute hinges that will permit the bottom faces of the members 15, 16 of the side members A to swing in the direction of each other when the harrow is to be folded.

The side members A, A serve to support the rocking tooth carrying bars 21 of which any desired number may be used. It will be observed, however, that the members 15 are of a length exceeding that of the members 16, so that the said members 15 will support one tooth carrying bar in excess of the number supported by the members 16, the said tooth carrying bars being, moreover, so disposed relatively to the harrow frame that when the latter is folded about the axis of the pivot members 19, the bars 21 carried by the members 16 will be disposed intermediate the bars 21 carried by the members 15, thereby preventing the teeth 22 carried by the respective bars from interfering with each other.

The tooth carrying bars 21 are each provided with an upwardly extending arm 23, said arms being serially connected together by an adjusting bar B which, like the side members A, is composed of two parts or members 24, 25, said members being provided at their meeting ends with downturned arcuate brackets 26, 27, the bracket 26 being bifurcated for the reception of the terminal of the bracket 27 with which it is connected by a pivot member 28. The construction of the adjusting bar, it will be observed, is identical with that of the side members A, the only difference being that the downturned brackets 26, 27 are of greater dimensions than the corresponding brackets of the side members, the parts being so proportioned that the axis of the pivot member 28 will be placed in alinement with the axes of the pivot members 19. The arm 23 extending upwardly from one of the tooth carrying bars is provided with an upward extension forming a hand lever 29 which is provided with a stop member 30 engaging a segment rack 31 on the adjusting bar B. It will be seen that by means of this lever the tooth carrying bars may be rocked to present the teeth at various angles with respect to the surface of the ground, the stop member 30 serving to secure the bars in adjusted position.

From the foregoing description taken in connection with the drawings hereto annexed, it will be seen that a folding harrow having adjustable teeth is produced which may be readily folded in small compass so that it may be readily manipulated by one man or boy in loading or unloading as well as when in active operation. The general construction of the device is simple and inexpensive, and it will be found to be thoroughly effective for the purposes for which it is provided.

Having thus described the invention, what is claimed as new, is:—

1. In a harrow of the class described, a frame including side members, each comprising front and rear members of unequal length, said front and rear members being provided at their meeting ends with downturned arcuate brackets, and pivot members connecting the same.

2. In a harrow of the class described, a frame including side members, each comprising front and rear members of unequal length, said front and rear members being provided at their meeting ends with downturned arcuate brackets, and pivot members connecting the same, one of the downturned brackets being bifurcated to receive the terminal of the other downturned bracket and presenting a bridge portion to limit the swinging movement thereof.

3. In a harrow of the class described, a frame including side members, each comprising a front and a rear member of unequal length, said members having downturned ends pivotally connected together, and rocking tooth carrying bars carried by the said front and rear members, the relatively long members carrying one bar in excess of the number carried by the relatively short members and said bars being so disposed that the bars carried by the short members will lie intermediate the bars carried by the long members when the frame is folded.

4. In a harrow of the class described, a frame including side members each comprising a front and a rear member having downturned ends pivotally connected together, rocking tooth carrying bars connected with said members, said tooth carrying bars having upwardly extending arms, an adjusting bar connected pivotally with the upwardly extending arms, said adjusting bar being composed of front and rear members having downturned ends pivotally connected together, the axes of the pivots connecting the members of the frame bars and the members of the adjusting bar being disposed in longitudinal alinement, and means for rocking the tooth carrying bars.

5. In a harrow of the class described, a frame including side members each comprising a front and a rear member having downturned ends pivotally connected together, rocking tooth carrying bars connected with said members, said tooth carrying bars having upwardly extending arms, an adjusting bar connected pivotally with the upwardly extending arms, said adjusting bar being composed of front and rear members having downturned ends pivotally connected together, the axes of the pivots connecting the members of the frame bars and the members of the adjusting bar being disposed in longitudinal alinement, and means for rocking the tooth carrying bars; the front and rear members of the frame bars and of the adjusting bar being of unequal length, the tooth carrying bars mounted on the long members of the frame bars numbering one in excess of the tooth carrying bars mounted on the short members of the frame bars, and the tooth carrying bars mounted on the short members of the frame bars being so disposed as to lie intermediate the tooth carrying bars mounted on the long members of the frame bars when the frame is folded.

In testimony whereof I affix my signature.

JESSE OLSON.

Copies of this patent may be obtained for five cents each, by addressing the "Commissioner of Patents, Washington, D. C."